(12) United States Patent
Schutz et al.

(10) Patent No.: US 6,305,723 B1
(45) Date of Patent: Oct. 23, 2001

(54) TOOL JOINT AND DRILL PIPE MADE THEREFROM

(75) Inventors: Ronald W. Schutz, Canfield, OH (US); Jackie E. Smith; Edmond I. Bailey, both of Houston, TX (US)

(73) Assignees: Grant Prideco, L.P., The Woodlands, TX (US); RTI International Metals, Niles, OH (US)

( * ) Notice: Subject to any disclaimer, the term of this patent is extended or adjusted under 35 U.S.C. 154(b) by 0 days.

(21) Appl. No.: 09/179,512

(22) Filed: Oct. 27, 1998

(51) Int. Cl.⁷ ..................................................... F16L 25/00
(52) U.S. Cl. ......................... 285/333; 285/381.1; 285/355
(58) Field of Search ................................. 285/329, 381.1, 285/333, 334, 355, 390

(56) References Cited

U.S. PATENT DOCUMENTS

| | | | |
|---|---|---|---|
| 1,364,478 | * | 1/1921 | Saunders . |
| 1,590,357 | * | 6/1926 | Feisthamel ........................... 285/333 |
| 2,054,118 | * | 9/1936 | Childs . |
| 2,298,049 | * | 10/1942 | Gardner . |
| 2,308,066 | * | 1/1943 | Evans ................................... 285/333 |
| 2,535,320 | * | 12/1950 | Richardson .......................... 285/333 |
| 2,563,515 | * | 8/1951 | Brown .................................. 285/333 |
| 2,626,190 | * | 1/1953 | Boice . |
| 3,923,324 | * | 12/1975 | Cruickshank et al. ............ 285/381.1 |
| 3,998,479 | * | 12/1976 | Bishop . |
| 4,012,061 | * | 3/1977 | Olson . |
| 4,294,559 | | 10/1981 | Schutzler . |
| 4,358,511 | | 11/1982 | Smith, Jr. et al. . |
| 4,445,265 | * | 5/1984 | Olson . |
| 4,915,426 | * | 4/1990 | Skipper ................................ 285/333 |
| 5,649,725 | * | 7/1997 | Nagasaku et al. ................... 285/334 |

OTHER PUBLICATIONS

Marks' Standard Handbook for Mechanical Engineers, pp. 5–4, Table 5.1.3.*

* cited by examiner

*Primary Examiner*—Lynne H. Browne
*Assistant Examiner*—Tomlyne A Malcolm
(74) *Attorney, Agent, or Firm*—Browning Bushman P.C.

(57) ABSTRACT

A tubular body made of a first metal and having a box end and a connection end, the box end having an internally threaded portion and an internal cylindrical thread-free portion axially outward of the threaded portion, the tool joint further including an anti-fretting section, preferably in the form of a sleeve of a second metal that is snugly received in a counterbore formed in the box end, the sleeve having an internal cylindrical surface having a diameter substantially the same as the internal diameter of the cylindrical thread-free portion of the box end, the second metal having a modulus of elasticity less than the modulus of elasticity of the first metal, the invention further including a drill pipe made by affixing first and second tool joints as described above to first and second opposed ends, respectively, of an elongate pipe body, the pipe body being affixed to the tool joints by a threaded shrink-grip connection, the first tool joint forming a box connection, the second tool joint forming a pin connection.

16 Claims, 2 Drawing Sheets

TOOL JOINT AND DRILL PIPE MADE THEREFROM

BACKGROUND OF THE INVENTION

1. Field of the Invention

The present invention relates to a tool joint and a drill pipe made therefrom. More particularly, the present invention relates to a composite tool joint comprised of dissimilar metals having different moduli of elasticity.

2. Description of the Prior Art

As the search for gaseous and/or liquid hydrocarbons expands, new drilling techniques are being used, wells are being drilled to greater and greater depths, and such hydrocarbons are being recovered from subterranean formations that are extremely hostile in the sense of containing highly corrosive gases and liquids. For example, in the recent past, there has been a dramatic increase in the amount of directional drilling including the drilling of so-called horizontal wells in which a well borehole is first drilled to a desired vertical depth and the well is then "kicked off" in a direction transverse to the vertical borehole and, in many cases, at right angles thereto. In many instances in these horizontal wells, the radius of curvature is quite short. For example, it is not uncommon for the drill pipe to be drilling in holes that change direction at the rate of approximately 30° per 100 feet.

As is well known, a drill pipe generally comprises threaded pipe connections known as "tool joints" that are interconnected by an elongate central portion, commonly referred to as the "pipe body." Typically, the tool joint connected to one end of the pipe body has a box connection while the tool joint connected to the other end of the pipe body has a pin connection. This allows successive lengths of drill pipe to be adjoined to one another to form the drill string.

As disclosed in the prior art, there are numerous methods of interconnecting the tool joints to the pipe body to form a length of drill pipe. One method of accomplishing this, and as disclosed in U.S. Pat. No. 4,445,265, incorporated herein by reference for all purposes, is what is known as a threaded shrink-grip connection. In this method, the ends of the pipe body are threaded, forming pins. Tool joints on each end of the pipe body are provided with a threaded box into which the pins are threadedly received. Typically, the box is slightly undersized so that the connection between the pin on the pipe body and box in the tool joint cannot be made until the tool joint is heated sufficiently to cause a desired amount of thermal expansion. The tool joint, thus heated, is then threaded onto the pin of the pipe body and cooled so that, as the former cools, it shrinks onto the pipe body, forming a tight, rigid, sealed connection.

As noted, many horizontal wells involve short radius curves. While the radius of bend in the pipe body of the drill pipe will generally follow the radius of curvature of the borehole, the sectional properties of the tool joint inherently make it stiff and prevent it from any significant bending in these curved boreholes. Bending of the pipe body occurs especially where it is adjoined to the tool joint, which leads to fatigue failures in this area. The bending stress in pipe is directly proportional to the modulus of elasticity of the pipe and inversely proportional to the radius of curvature of the borehole. Accordingly, for a drill pipe that is made from a material having a high modulus of elasticity, bending stresses become very high in a short-radiused borehole. Thus, drill pipe wherein the pipe body and the tool joints are made of steel exhibit high bending stresses in short-radiused boreholes since steel has a modulus of elasticity of approximately 30 million psi. On the other hand, titanium has a modulus of elasticity of 17 million psi. Accordingly, titanium is much more flexible than steel and is subject to lower bending stress than steel under the same conditions. Furthermore, titanium is lighter weight than steel, which decreases frictional losses when the drill string is being pushed or pulled through non-vertical holes. As is also well known, titanium is also more corrosion-resistant than steel and accordingly is much preferred in cases where the well contains corrosion-inducing fluids. Thus, while drill pipe made of titanium pipe bodies and steel tool joints would be much preferred in directional drilling for reasons mentioned above, it has been found that prior art titanium drill pipe employing a titanium pipe body connected to a steel tool joint by a threaded shrink-grip connection exhibited low fatigue life generally at the juncture of the titanium pipe body and the steel tool joint.

SUMMARY OF THE INVENTION

It is therefore an object of the present invention to provide a composite tool joint made of dissimilar metals having different moduli of elasticity.

Another object of the present invention is to provide a tool joint made primarily of steel and containing an anti-fretting section, e.g., a sleeve, that minimizes fatigue failure of a pipe body and is made of a material having a modulus of elasticity lower than the modulus of elasticity of the steel.

The above and other objects of the present inventions will become apparent from the drawings, the description given herein, and the appended claims.

In one embodiment, the present invention provides a tool joint having a tubular body of a first metal having a box end and a connection end. The box end has an internally threaded portion and an internal, cylindrical thread-free portion axially outward of the threaded portion. The thread-free portion is at least partially defined by an axially extending, annular section of a second metal having a modulus of elasticity less than the modulus of elasticity of the first metal. The section of the second metal, which can be referred to as an anti-fretting section, has an internal cylindrical surface with an internal diameter substantially the same as the internal diameter of the cylindrical, thread-free portion of the box end.

In another embodiment, there is provided a drill pipe for use in a drill string. The drill pipe includes an elongate pipe body having a first end and a second end, the first end of the pipe body having an externally threaded portion and an external cylindrical surface, generally contiguous the externally threaded portion, but in any event, axially inward thereof, the second end of the pipe body having a connector for releasably connecting the drill pipe in the drill string. The drill pipe further includes a tool joint as described above and in which the externally threaded portion on the first end of the pipe body is threadedly received in the internally threaded portion of the tubular body of the tool joint, the external cylindrical surface of the pipe body being in shrink-grip engagement with the internal cylindrical thread-free portion of the tubular body. The pipe body is made of a third metal having a modulus of elasticity closer to the modulus of elasticity of the second metal than the modulus of elasticity of the first metal.

In a preferred embodiment, the pipe body is made of titanium, the tool joint is made primarily of steel, and the anti-fretting section is made of yet a third metal, which can be the same as the metal of the pipe body or different, e.g., copper, brass, etc.

DESCRIPTION OF THE PREFERRED EMBODIMENTS

While the present invention will be described with particular reference to a tool joint made primarily of steel and to a drill pipe wherein the pipe body is made primarily of titanium and the tool joint is made primarily of steel, it is to be understood that the invention is not so limited. In particular, the present invention is applicable to the use of a wide variety of metals wherein the tool joint of the drill pipe is made of a material having a high modulus of elasticity (Young's Modulus), e.g., greater than 25 million psi, and the pipe body of the drill pipe is made of a material having a low modulus of elasticity, e.g., less than 21 million psi. It will be understood that the term "titanium" is intended to include titanium itself, as well as alloys thereof, and that the term "steel" is intended to include those predominantly iron-containing metals that are malleable under certain conditions as distinguished from iron materials such as cast iron, pig iron, and the like. Also, while the invention will be described with particular reference to an antifretting ring or sleeve, as will be seen hereafter, the invention is not so limited.

Figure 1A:
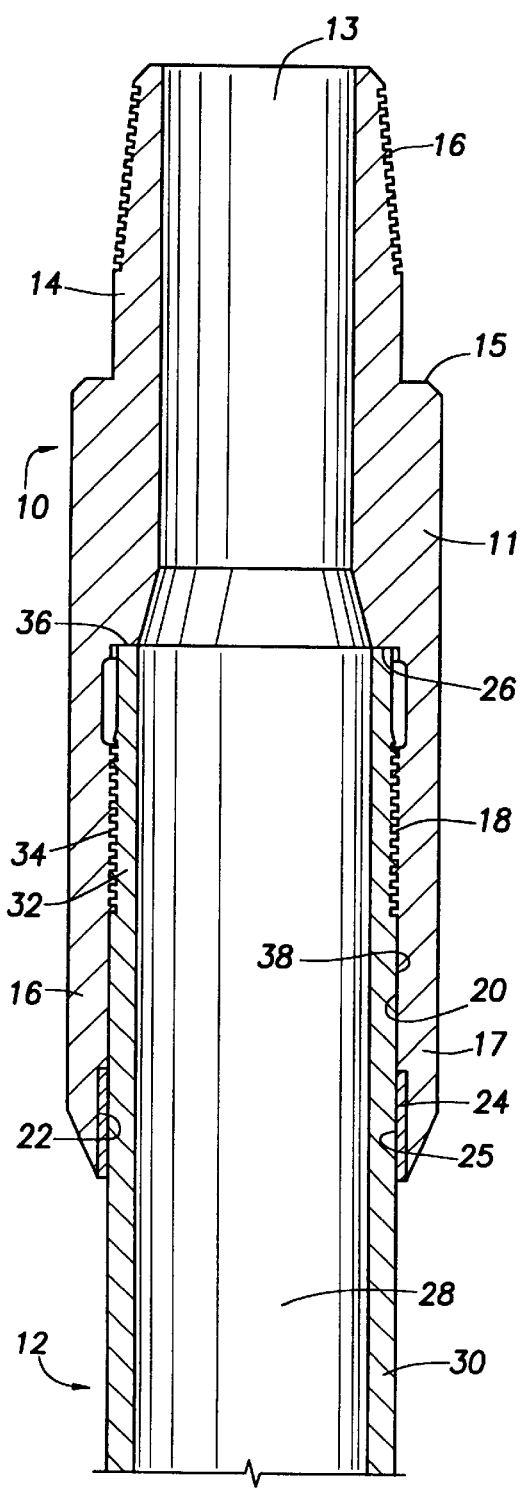
FIGS. 1A and 1B are elevational cross-sectional views of a drill pipe, including the tool joint of the present invention.

With reference first to FIG. 1A, there is shown one end of a drill pipe in accordance with the present invention. The drill pipe indicated generally as P is comprised of a steel tool joint, shown generally as 10, and a titanium pipe body, shown generally as 12. Tool joint 10 has a tubular body 11 having a central bore 13 extending therethrough and has a connection end 14 that, as shown, is externally threaded at 16 to form a pin connection. Connection end 14 is also provided with a make-up or torque shoulder 15 such that when pin connection 16 is received in a complementary box formed in another piece of drill pipe, shoulder 15 engages a shoulder on the box so that the drill pipe can be made up to the desired torque. On the opposite end, tubular body 10 forms a box end 17, box end 17 being provided with an internal female threaded portion 18 and a cylindrical thread-free portion 20, thread-free portion 20, preferably being contiguous, but in any event extending axially outwardly of threaded portion 18. Box end 17 is further provided with a landing shoulder 26 axially inward of threaded portion 18. Box end 17 is also provided with a cylindrical counterbore 22, in which is received an anti-fretting ring 24, described more fully hereafter. Anti-fretting ring, or sleeve, 24 has an outside dimension so as to be generally snugly received in counterbore 22, sleeve 24 generally being inserted into counterbore 24 by a tap fit. While preferably the external surface of sleeve 24 will be cylindrical, it will be recognized that the external surface of sleeve 24 could be in the shape of a polygon, the polygon having at least three circumferentially spaced vertices that center sleeve 24 in counterbore 22 and that are sized so as to provide a generally snug or tap fit of sleeve 24 in counterbore 22. Sleeve 24 has an internal cylindrical surface 25 having substantially the same diameter as cylindrical thread-free portion 20.

Pipe body 12, which is made of titanium, is an elongate tubular body having a bore 28 therethrough, bore 28 being defined by a cylindrical wall 30. As seen, an end 32 of pipe body 12 is received in box end 16 of tool joint 10. End 32 is provided with an external male threaded portion 34 that has threads complementary to the threads formed on internal female threaded portion 18, threaded portions 34 and 18 being engaged, the end surface 36 of pipe body 12 abutting landing shoulder 26 when pipe body 12 and tool joint 10 are made up. End 32 of pipe body 12 also is provided with an external cylindrical surface 38 that, as seen in FIG. 1A, is in engagement with internal cylindrical thread-free portion 20 of tool joint 10 and internal cylindrical surface 25 of sleeve 24.

To assemble the drill pipe P, and as well known by those skilled in the art, tool joint 10 is heated to an elevated temperature (generally from about 600° F. to about 900° F.) sufficient to cause tool joint 10, and hence box end 17, to expand. While the tool joint is heated, end 32 of pipe body 12 is screwed into box end 17 of tool joint 10 until end surface 36 engages landing shoulder 26. Since the box formed in the box end 17 is slightly undersized with respect to pipe body 12, or at least pipe end 32, pipe body 12 cannot be received in the box end 17 of tool joint 10 until tool joint 10 is heated to the temperature described above and expands. Once end portion 32 is received in the heated tool joint 10 such that end surface 36 abuts landing shoulder 20, tool joint 10 is cooled. As tool joint 10 cools, it exerts a radially inwardly directed, compressive force on end portion 32 of pipe body 12, thereby forming a threaded, shrink-grip connection that is fluid tight. In this regard, cylindrical surface 20 in box end 17 of tool joint 10 and cylindrical surface 38 on pipe body 12 will be in shrink-grip engagement. Likewise, cylindrical surface 38 on pipe body 12 will be in shrink-grip engagement with cylindrical surface 25 of sleeve 24. It will be appreciated that sleeve 24 is inserted into counterbore 22 prior to the time tool joint 10 is heated. It will also be appreciated that as tool joint body 11 cools, a compressive axial force will be applied against end surface 36 by landing shoulder 26.

Figure 1B:
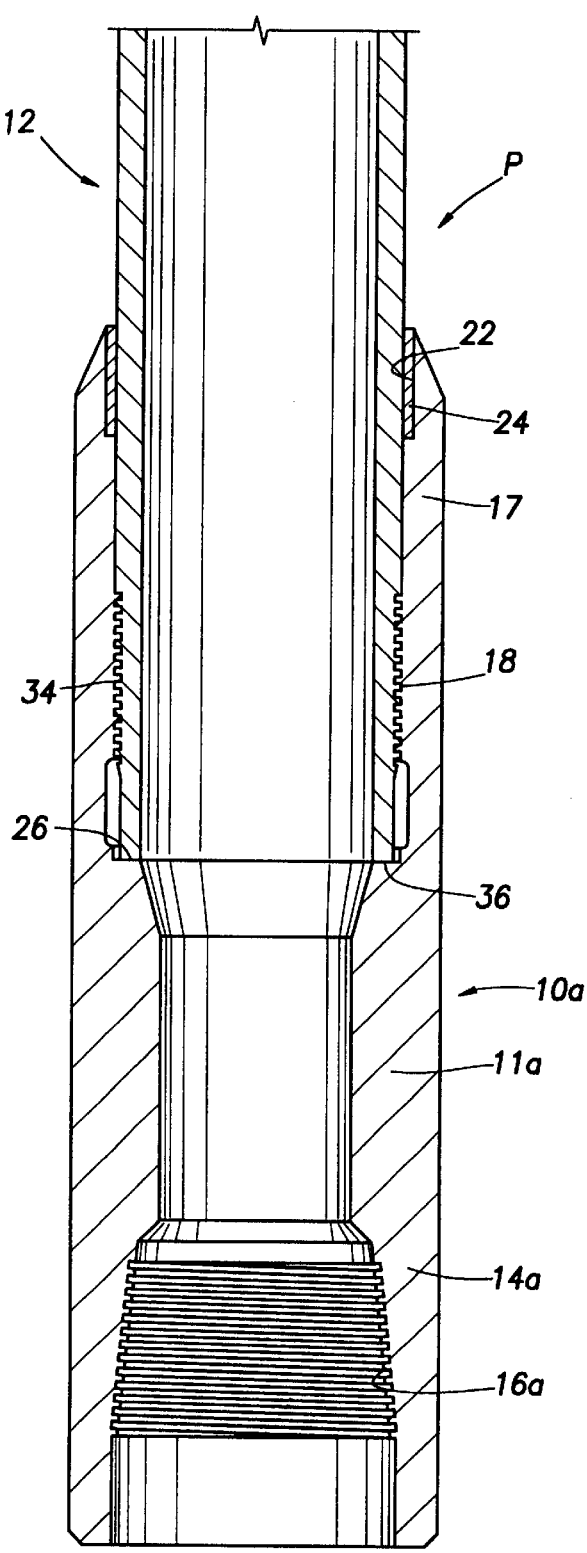

FIG. 1B shows the opposed end of pipe body 12 provided with a tool joint 10a. Tool joint 10a differs from tool joint 10 only in that the connection end 14a is provided with a box connection having internal threads such that the drill pipe P has a pin connection 16 at one end and a box connection 16a at the opposite end. However, it will be appreciated that pipe body 12 is affixed to tool joint 10a in the same manner described above with respect to the connection of pipe body 12 to tool joint 10.

Figure 2:
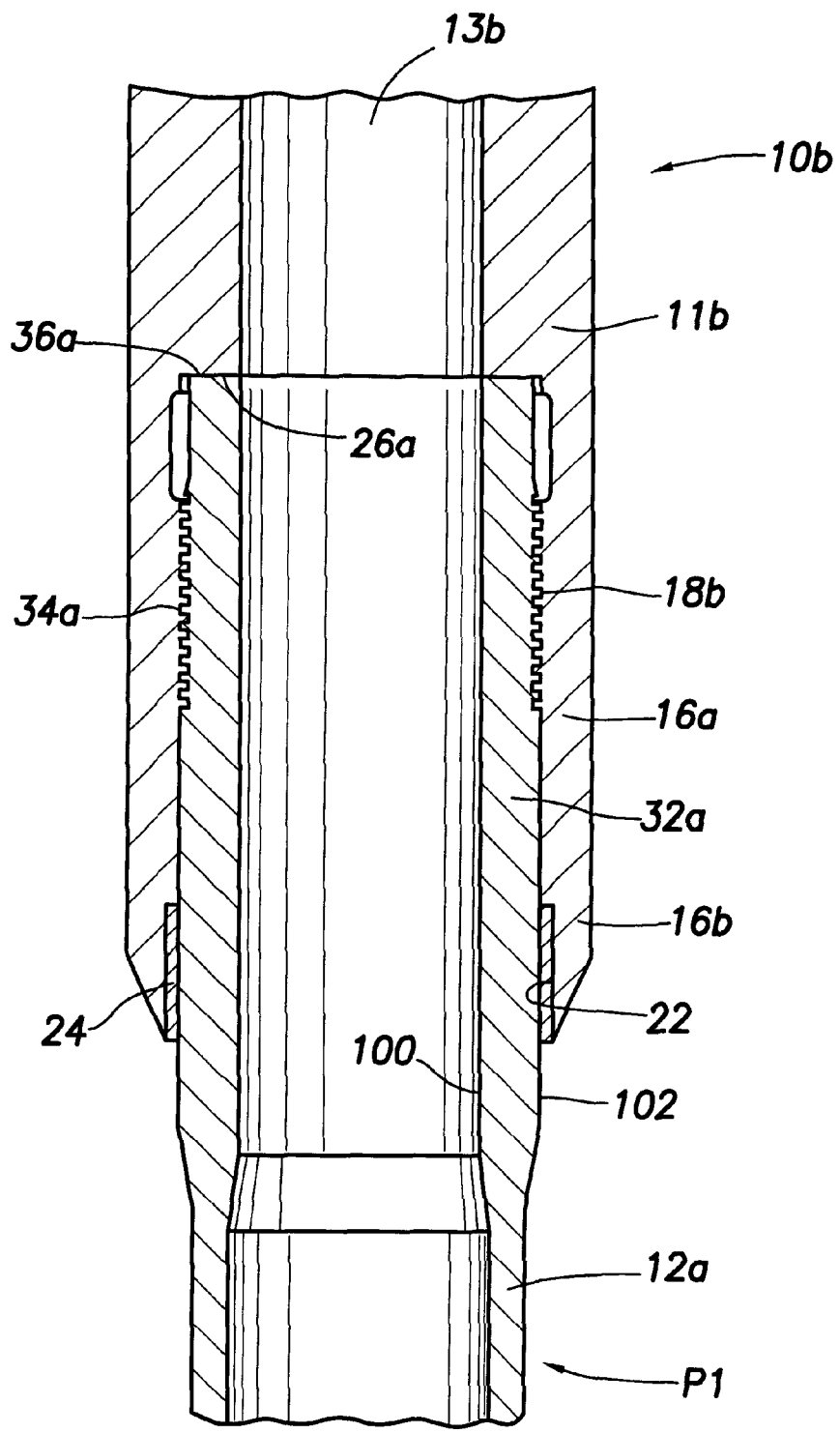
FIG. 2 is a partial, elevational cross-sectional view of another embodiment of the drill pipe of the present invention.

FIG. 2 shows a modified embodiment of the drill pipe of the present invention wherein the ends of the pipe body, which are connected to the tool joints, are upset, both internally and externally, it being recognized that in certain cases only one such upset is present. Pipe body 12a has an internal annular upset portion 100 and an external annular upset portion 102 to provide a pipe end 32a that has a greater wall thickness than the remainder of pipe body 12a, pipe body 12a being provided with external threads 34a. In this regard, it is to be noted that with respect to the embodiment shown in FIGS. 1A and 1B, pipe body 12 is of substantially uniform wall thickness throughout its entire length. Tool joint 10b has a body 11b having a threaded portion 18b and a box end 16b that is provided with a landing shoulder 26a that is abutted by end surface 36a of pipe body 12a when tool joint 10b and pipe body 12a are connected. As in the case of the embodiment shown in FIGS. 1A and 1B, box end 16B is provided with a counterbore 22 in which is received an anti-fretting ring 24 as described above. It will be appreciated that the end of tool joint 10b opposite box end 16b can be provided with either a box or pin connection, such as 14a or 14, respectively, as shown in FIGS. 1A and 1B. As can be seen with reference to FIG. 2, upsetting pipe body 12a results in the bore 13b in tool joint 10b having substantially the same internal diameter as the internal diameter of the pipe 32a, thereby providing less turbulent flow through the drill pipe $P_1$. This is to be contrasted with the embodiment shown in FIGS. 1A and 1B, wherein bore 13 or 13a are of are duced diameter relative to the end portions 32 of pipe 12. Other than as described above, in all other respects, drill pipe $P_1$ is substantially the same as drill pipe P and is made by a threaded shrink-grip method, as described above with respect to drill pipe P.

While in the description above, the anti-fretting section of the tool joint 10 has been described with reference to a sleeve or ring 24 that is received in counterbore 22, the invention is not so limited. Specifically, the composite tool joint of the present invention can be formed with the anti-fretting section comprising a plated section on the thread-free portion, i.e., portion 20. When the anti-fretting section is formed of a plating, it will be appreciated, as in the case of the anti-fretting ring or sleeve, that the annular plated section extends for a suitable axial distance and will have an internal cylindrical surface that is substantially the same as the internal diameter of the cylindrical thread-free portion of the box end. To this end, the annular relief, or recess, formed in the box end, i.e., in the thread-free portion, would have a depth substantially equivalent to the thickness of the plating to be deposited. As is well understood by those skilled in the art, such a plating could be thermally sprayed on (flame, electric, or plasma), by physical and/or chemical vapor deposition or by electroplating or electroless-plating. While when the anti-fretting section is formed by plating, the radial thickness of the plating can be as small as 1 mil, it is preferred that it have a minimal thickness of about 50 mils. Obviously, the plating could be much thicker, if desired, if plating were selected as the method of forming the anti-fretting section as opposed to using an anti-fretting ring or sleeve.

It should also be understood that the anti-fretting section need not be positioned adjacent to the mouth or opening forming the box, i.e., the anti-fretting section could be inward of the end of the box. For example, if the end of the box had a slight radially outward flare, an annular groove or relief displaced internally of the outer end of the box and toward the threaded section of the box, could be formed, the anti-fretting ring or sleeve being in the form of a split ring that could then be inserted into the groove. In like fashion, if the anti-fretting section were formed by plating, such a recess, groove, or relief could also be formed axially inward of the end of the box, the second metal being deposited in the groove, recess, or relief. In any event, whatever the configuration, the anti-fretting section will have a cylindrical inner surface that is substantially the same in diameter as the diameter of the thread-free portion of the box end.

As noted above, tool joint 10 is composite in the sense that it is made or comprised of two, dissimilar metals, i.e., the tool joint body 11 and the anti-fretting section, e.g., ring 24. Preferably, since the drill pipe P is made by a shrink grip fit that requires heating of the tool joint 10, the material from which the anti-fretting section is made will have a coefficient of thermal expansion that is approximately the same or greater than the coefficient of thermal expansion of the material from which the body 11 of the tool joint 10 is made.

The anti-fretting section, e.g., ring 24, will be made of a metal having a modulus of elasticity that is less than the modulus of elasticity of the material making up the body 11, 11a of tool joint 10, 10a. Also, the material from which the pipe body 12 is made will have a modulus of elasticity that is closer to the modulus of elasticity of the material of the anti-fretting section than the modulus of elasticity of the material from which the body 11 of the tool joint 10, 10a is made. Broadly, the invention finds applicability to drill pipe and similar tubulars wherein the modulus of elasticity of the material forming the body 11 of the tool joint 10 is at least 25% greater than the modulus of elasticity of the material from which the anti-fretting section is made and wherein the modulus of elasticity of the material from which the pipe body 12 is made is no more than about 10% greater than the modulus of elasticity of the material from which the anti-fretting section is made. In general, the invention finds particular utility where the modulus of elasticity of the material forming the tool joint body 11 is 25 million psi or greater, preferably from about 25 to about 32 million psi, and the moduli of elasticity of the materials forming the pipe body 12 and the anti-fretting section is about 21 million psi or less, preferably from about 12 to about 21 million psi.

In the specific case of a typical, titanium drill pipe used in the oil and gas industry, the body 11 of the tool joint is typically made of a carbon steel having a modulus of elasticity of 29 to 31 million psi, depending upon the precise type of steel, whereas the pipe body 12 is made of titanium or typical titanium alloys, the modulus of elasticity of those materials generally being in the range of from about 14 to about 19 million psi. Accordingly, in line with the above-described ranges and when the drill pipe is made from a titanium or titanium alloy pipe body and the tool joints are made of mild steel, the anti-fretting section would be made of a material having a modulus of elasticity no greater than about 21 million psi. As noted, the titanium pipe is under a radially inwardly directed compressive force from the box portion of the tool joint due to the shrink-grip connection. It is desirable that the anti-fretting section likewise maintain this compressive loading on the titanium pipe body. Accordingly, the modulus of elasticity of the material from which the sleeve 24 or anti-fretting section is made should not be so low that this compressive force is not transmitted to the pipe body. More generally, the modulus of elasticity of the material from which the anti-fretting section is made must be high enough to prevent any significant bending of the titanium pipe body at the intersection of the axially innermost extent of the anti-fretting section and the tool joint 10, e.g., at the innermost end of the counterbore 22 into which the sleeve 24 fits. Preferably, the material from which the anti-fretting section is made will have a modulus of elasticity that is plus or minus 5% of the modulus of elasticity of the material of the pipe body.

Numerous metals can serve as a material of construction of the anti-fretting section. Non-limiting examples of such metals include titanium and certain of its alloys, e.g., various titanium-aluminum alloys, copper and various copper alloys, various forms of brass, various forms of bronze, tin, aluminum, etc. It will be appreciated that the sleeve 24 and the pipe body 12 can be made of the same material.

The radial thickness and length of the anti-fretting section, e.g., sleeve 24, will depend upon the particular material chosen to make the anti-fretting section, the size of the tool joint, and other such factors. So long as the compressive radial force induced by the shrink-grip fit of the tool joint 10 around the pipe body 12 is not significantly reduced, the length and radial thickness of anti-fretting section can vary widely. When a sleeve such as sleeve 24 is used, the cost of materials and machining dictates that the sleeve 24 have not only the minimum radial thickness that is functional but also the minimum axial length that is functional. The term "functional" as used herein means that the fatigue life of the pipe body is increased by a factor of at least 4. In measuring fatigue life, a fatigue test machine can be used wherein the tool joint 10 is bucked up into the chuck of the machine and a bending load is induced into the titanium pipe body 12 while the tool joint 10 and connected pipe body 12 are rotated. In general, the radial thickness of the anti-fretting section, i.e., the perpendicular distance from the inside diameter to the outside diameter of the anti-fretting section, will be at least 1 mil, preferably 50 mils, to ⅝ inch. In the case where a sleeve is used, the radial thickness will be at least 1/16 inch, preferably at least ⅛ inch, but will not be so thick so as to reduce, to any extent, the sectional properties of the steel tool joint locus surrounding the sleeve. This, of course, is also true when the anti-fretting section is formed by plating or some other metal deposition method. In general, it is preferred to use a sleeve or ring that will have a radial thickness of from about 1/16 inch to about ⅝ inch. Theoretically, the minimum axial length of the anti-fretting section, e.g., sleeve 24, need only be long enough to reach deep enough into the tool joint 10 to provide anti-fretting protection to the mating surfaces having significant relative motion caused by the designed bending loads. Thus, in theory, and depending upon the OD of the pipe body 12, the anti-fretting section, e.g., sleeve 24, could have a quite short axial length. As a practical matter, for ease of installation in the case of a sleeve, it is preferred that the sleeve have an axial length of at least ⅛ inch, preferably from about ¼ inch to about 4 inches, most preferably from about ¼ inch to about 1½ inches.

In actual testing it has been found that in side-by-side comparisons, there was a dramatically reduced fatigue failure of the titanium pipe body when the drill pipe was made using the composite tool joint of the present invention as compared to a steel only tool joint. In comparative fatigue tests conducted as described above, using a tool joint made entirely of steel, i.e., containing no anti-fretting ring, versus tests using a tool joint having a copper anti-fretting ring, it was found that fatigue life was increased by a factor of 10 on the assembly that had the anti-fretting ring. While this increased fatigue life is not fully understood, it is believed that when a prior art drill pipe is in a drill string being subjected to rotational and bending forces, the pipe body undergoes fretting just inwardly of the box end of the tool joint because of the disparity in the moduli of elasticity of the material of the pipe body (titanium) and the material of the tool joint (steel). By providing an anti-fretting section having a modulus of elasticity that is less than that of the tool joint and closer to that of the material of the pipe body, this fretting is reduced. More specifically, it is believed that when subjected to bending loads while the drill string is being rotated, the anti-fretting section moves with the pipe body. Accordingly, there is little or no relative movement between the pipe body and the anti-fretting section at the point where the maximum bending stress is occurring.

It is also advantageous that the material of the anti-fretting section be softer or more malleable than the material forming the body of the tool joint. Generally speaking, it is desirable that the material, i.e., the second metal forming the anti-fretting section—e.g., ring 24—will have a hardness softer than 200 BHN (92 HRB), preferably less than 120 BHN (70 HRB).

The foregoing description and examples illustrate selected embodiments of the present invention. In light thereof, variations and modifications will be suggested to one skilled in the art, all of which are in the spirit and purview of this invention.

What is claimed is:

1. A drill pipe for use in a drill string, comprising:
    an elongate pipe body, said pipe body having a first end and a second end, said first end of said pipe body having an externally threaded portion and an external thread-free surface axially inward of said externally threaded portion, said second end of the pipe body having a connector for releasably connecting said drill pipe in said drill string; and
    a tool joint, comprising:
        a tubular body of a first metal having a box end and a first connector end, said box end having an internally threaded portion and an internal thread-free portion axially outward of said threaded portion and in fixed engagement with the external thread-free surface of the pipe body; and
        an axially extending, annular anti-fretting section of a second metal within a counterbore in the box end outward of the thread-free portion, the counterbore having a diameter greater than the maximum diameter of the thread-free portion in fixed engagement with the external thread-free surface of the pipe body, said anti-fretting section being disposed axially outward of said threaded portion, said anti-fretting section having an internal surface substantially flush with said thread-free portion in said box end, said externally threaded portion on said first end of said pipe body being threadedly received in said internally threaded portion of said tubular body, said external thread-free surface of said pipe body being in shrink-grip engagement with said internal thread-free portion of said tubular body, said pipe body being made of a third metal having a modulus of elasticity closer to the modulus of elasticity of said second metal than the modulus of elasticity of said first metal.

2. The drill pipe of claim 1 wherein said anti-fretting section comprises a sleeve of said second metal snugly received in said counterbore.

3. The drill pipe of claim 2 wherein said sleeve has a cylindrical outer surface.

4. The drill pipe of claim 1 wherein the modulus of elasticity of said first metal is approximately 25% greater than the modulus of elasticity of said second metal.

5. The drill pipe of claim 1 wherein the modulus of elasticity of the first metal is 25 million psi or greater and the modulus of elasticity of the second metal is about 21 psi or less.

6. The drill pipe of claim 1 wherein the modulus of elasticity of the first metal is from about 25 million psi to about 32 million psi and the modulus of elasticity of the second metal is from about 12 million psi to about 21 million psi.

7. The drill pipe of claim 1 wherein the second metal is comprised of copper.

8. The drill pipe of claim 7 wherein said first metal is comprised of steel.

9. The drill pipe of claim 8 where in said pipe body is comprised of titanium.

10. The drill pipe of claim 2 wherein said sleeve has an outer cylindrical surface and the radial thickness of said sleeve is from about 1/16 inch to about ⅝ inch.

11. The drill pipe of claim 1 wherein said anti-fretting section has an axial length of at least ⅛ inch.

12. The drill pipe of claim 1 wherein said anti-fretting section has an axial length of from about ¼ inch to about 4 inches.

13. The drill pipe of claim 1 wherein the anti-fretting section has a radial thickness of from 1 mil to ⅝ inch.

14. The drill pipe of claim 1 wherein said connector on said second end of said pipe body comprises a second tool joint, said connector end of said second tool joint forming a pin connection, said connection end of said tool joint on said first end of said pipe body forming a box connection.

15. The drill pipe of claim 1 wherein said external thread-free surface is cylindrical and said internal surface of said anti-fretting section is cylindrical.

16. The drill pipe of claim 1, wherein said pipe body has a first end, axially facing surface and said tubular body has an axially facing landing shoulder, said first end, axially facing surface and said landing shoulder being in engagement when said pipe body is threadedly received in said tubular body.

* * * * *